(12) United States Patent
Yakimenko et al.

(10) Patent No.: US 10,515,458 B1
(45) Date of Patent: Dec. 24, 2019

(54) IMAGE-MATCHING NAVIGATION METHOD AND APPARATUS FOR AERIAL VEHICLES

(71) Applicant: The United States of America, as represented by the Secretary of the Navy, Arlington, VA (US)

(72) Inventors: Oleg A. Yakimenko, Seaside, CA (US); Ryan J. Decker, Lake Hopatcong, NJ (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 59 days.

(21) Appl. No.: 15/907,453

(22) Filed: Feb. 28, 2018

Related U.S. Application Data

(60) Provisional application No. 62/554,878, filed on Sep. 6, 2017.

(51) Int. Cl.
*G06T 7/66* (2017.01)
*G06T 7/73* (2017.01)
(Continued)

(52) U.S. Cl.
CPC ............... *G06T 7/74* (2017.01); *G06T 7/66* (2017.01); *G06T 17/05* (2013.01); *H04N 7/183* (2013.01);
(Continued)

(58) Field of Classification Search
CPC .. G06T 7/74; G06T 7/66; G06T 17/05; G06T 2207/30241; G06T 2207/30181; H04N 7/183
See application file for complete search history.

(56) References Cited

U.S. PATENT DOCUMENTS 5,146,228 A 9/1992 Irani et al.
5,920,337 A 7/1999 Glassman et al.
(Continued)

OTHER PUBLICATIONS

Kong et al., "Feature-based navigation for UAVs," EEE/RSJ International Conference on Intelligent Robots and Systems (2006).
(Continued)

*Primary Examiner* — Shawn S An
(74) *Attorney, Agent, or Firm* — Naval Postgraduate School; James B. Potts; Lisa A. Norris

(57) ABSTRACT

A method and apparatus for estimating the position and attitude of an aerial vehicle transiting over terrain through a combination of steps combining image registration and the inherent image coordinate system of the camera. The aerial vehicle captures an image of the terrain and extracts features from the camera image and pre-existing aerial imagery, and determines a perspective transform between the images. Image reference points are projected with the 2D perspective transform and an elevation map provides estimated 3D coordinates of the image reference points. Subsequently a camera position and orientation necessary for the camera to obtain the initial camera image is determined by projecting reference points with locations defined by the image coordinate system of the camera to define terrain points, and conducting an optimization to minimize displacements between the estimated coordinates and the terrain coordinates. The estimated camera position provides a location and attitude for the aerial vehicle.

19 Claims, 5 Drawing Sheets

(51) Int. Cl.
*H04N 7/18* (2006.01)
*G06T 17/05* (2011.01)
(52) U.S. Cl.
CPC .............. *G06T 2207/30181* (2013.01); *G06T 2207/30241* (2013.01)

(56) References Cited

U.S. PATENT DOCUMENTS

| | | | |
|---|---|---|---|
| 6,853,332 B1 | 2/2005 | Brookes | |
| 7,827,507 B2 | 11/2010 | Geise et al. | |
| 9,986,233 B1* | 5/2018 | Curlander | H04N 17/002 |
| 2006/0232585 A1* | 10/2006 | Montagnese | G06T 3/0018 345/428 |
| 2013/0223673 A1* | 8/2013 | Davis | G06K 9/78 382/100 |
| 2013/0287290 A1* | 10/2013 | Owechko | G06T 17/05 382/154 |
| 2016/0266582 A1* | 9/2016 | Carter | G05D 1/12 |
| 2018/0089515 A1* | 3/2018 | Yang | G06K 9/6274 |
| 2018/0165831 A1* | 6/2018 | Kwant | G06T 7/74 |
| 2018/0283876 A1* | 10/2018 | Cregan | G06F 3/04883 |

OTHER PUBLICATIONS

Department of Defense, The Unmanned Systems Integrated Roadmap FY2011-2036 (2011), available at http://www.dtic.mil/docs/citations/ADA558615, last accessed Feb. 14, 2018.
Eure et al., "An application of UAV attitude estimation using a low-cost inertial navigation system," (2013), available at https://ntrs.nasa.gov/search.jsp?R=20140002398, last accessed Feb. 14, 2018.
Lowe et al. "Distinctive image features from scale-invariant keypoints," International Journal of Computer Vision 60(2) (2004).
Leutenegger et al., "BRISK: Binary robust invariant scalable keypoints," 2011 IEEE International Conference on Computer Vision (ICCV) (2011).
Bay et al., "SURF: Speeded up robust features," Computer Vision—ECCV 2006 (2006).
Fischler et al., "Random sample consensus: a paradigm for model fitting with applications to image analysis and automated cartography," Communications of the ACM 24(6) (1981).
Choi et al., "Performance evaluation of RANSAC family," Journal of Computer Vision 24(3) (1997).
Conte et al., "An Integrated UAV Navigation System Based on Aerial Image Matching," Aerospace Conference, 2008 IEEE (2008).
Conte et al., "Vision-Based Unmanned Aerial Vehicle Navigation Using Geo-Referenced Information," EURASIP Journal on Advances in Signal Processing (2009).
Ivanscits et al.,"Visual navigation system for small unmanned aerial vehicles," Sensor Review 33(3) (2013).
Mathe et al., "Vision and Control for UAVs: A Survey of General Methods and of Inexpensive Platforms for Infrastructure Inspection," Sensors 15 (2015).
Conte et al., "Use of Geo-referenced Images with Unmanned Aerial Systems." SIMPAR 2008 Intl. Conf. on Simulation, Modeling and Programming for Autonomous Robots (2008).
Hui et al., "Vision-based autonomous navigation approach for unmanned aerial vehicle transmission-line inspection," International Journal of Advanced Robotic Systems Jan.-Feb. (2018).
El-Gayar et al., "A comparative study of image low level feature extraction algorithms," Egyptian Informatics Journal 14 (2013).
Salahat et al., "Recent Advances in Features Extraction and Description Algorithms: A Comprehensive Survey," Annual IEEE Industrial Electronics Societys 18th International Conf. on Industrial Technology (ICIT) (2017).
Neto et al., "On the Improvement of Image Feature Matching under Perspective Transformations," 23rd SIBGRAPI Conference on Graphics, Patterns and Images (SIBGRAPI) (2010).
Mondrogon et al., "Omnidirectional Vision Applied to Unmanned Aerial Vehicles (UAVs) Attitude and Heading Estimation," Robotics and Autonomous Systems 58(6) (2010). 819.
Yakimenko et al., "Unmanned Aircraft Navigation for Shipboard Landing using Infrared Vision," IEEE Transactions on Aerospace and Electronic Systems 38(4) (2002).
Valasek et al., "Vision-Based Sensor and Navigation System for Autonomous Air Refueling," Journal of Guidance, Control, and Dynamics 28(5) (2005).
Courbana et al., "Vision-Based Navigation of Unmanned Aerial Vehicles," Control Engineering Practice 18(7) (2010).
Li et al., "Multi-Target Detection and Tracking from a Single Camera in Unmanned Aerial Vehicles (UAVs)," IEEE/RSJ International Conference on Intelligent Robots and Systems (IROS) (2016).
Wessel et al., "Registration of Near Real-Time SAR Images by Image-to-Image Matching," International Archives of Photogrammetry, Remote Sensing and Spatial Information Sciences (2007).
Luiz et al., "Exploiting Attitude Sensing in Vision-Based Navigation for an Airship," Journal of Robotics 2009 (2009).
Tao et al., "Real-Time Matching Algorithm of Navigation Image Based on Corner Detection," International Symposium on Photoelectronic Detection and Imaging (2009).
TaAo et al., "Study on the Sidescan Sonar Image Matching Navigation Based on SURF," International Conference on Electrical and Control Engineering (2010).
Lin et al., "Improving the Efficiency and Accuracy of SIFT Image Matching," 2nd International Congress CACS (20111).
Rockett et al., "Performance Assessment of Feature Detection Algorithms: A Methodology and Case Study on Corner Detectors," IEEE Transactions on Image Processing, 12(12) (2003).
Van Der Wal et al., "FPGA Acceleration for Feature Based Processing Applications," Computer Vision and Pattern Recognition Workshop (2015).
Madbouly et al., "Performance Assessment of Feature Detector-Descriptor Combination," IJCSI International Journal of Computer Science Issues 12(5) (2015).
Kendoula et al., "Optic Flow-Based Vision System for Autonomous 3D Localization and Control of Small Aerial Vehicles," Robotics and Autonomous Systems 57(6-7) (2009).
Hamaoui et al., Optical Flow-Based State Estimation for Guided Projectiles, Research Report ARL-TR-7321, US Army Research Laboratory (2015).

\* cited by examiner

IMAGE-MATCHING NAVIGATION METHOD AND APPARATUS FOR AERIAL VEHICLES

RELATION TO OTHER APPLICATIONS

This patent application is a nonprovisional of and claims benefit from U.S. Provisional application 62/554,878 filed Sep. 6, 2017, which is hereby incorporated by reference in its entirety.

FIELD OF THE INVENTION

One or more embodiments relates generally to an image matching navigation apparatus and method for an aerial vehicle.

BACKGROUND

Navigation systems of the vast majority of surface, ground, and aerial vehicles has become heavily reliant on the updates received with help of the Global Positioning System (GPS). Combined with high-rate outputs from the Inertial Navigational System (INS), the integrated INS/GPS navigation system is capable of assuring accuracy within one meter for determining the vehicle's position with respect to the surface of the Earth while also contributing to a more accurate estimation of an attitude (for large vehicles). Operating on other planets or in a GPS degraded/denied environment on Earth leaves the standard INS to be the only source of the vehicle's movement estimation, and eventually causes a substantial degradation of vehicle capabilities.

There is an interest to use alternative sources to sense the vehicle's movement and rotation along with INS or even with INS/GPS, particularly with autonomous vehicles. Typically autonomous vehicles are commonly equipped with a variety of miniature passive sensors providing situational awareness. The Earth's magnetic field, position of the sun, and even the ground-sky temperature gradient are some of the environmental cues that have been leveraged for navigation purposes. In situations when a vehicle is equipped with a vision-based system, optical sensors can naturally be used as a navigation aid as well. Using computer vision to support a variety of the navigation tasks for autonomous vehicles is a rapidly growing area of development.

There is a body of literature describing different approaches to utilize simultaneous localization and mapping, especially for indoor vehicles. Such efforts may consist of pose estimation with respect to the objects of known geometry, object and obstacle detection, etc. Some approaches use an omnidirectional sensor to identify a skyline and use it for attitude and heading estimation. See e.g. Mondragón et al., "Omnidirectional Vision Applied to Unmanned Aerial Vehicles (UAVs) Attitude and Heading Estimation," *Robotics and Autonomous Systems* 58(6) (2010). Others use optical sensors to navigate with respect to a moving ship, aerial fuel tankers, natural landmarks, and airports. See e.g. Yakimenko et al., "Unmanned Aircraft Navigation for Shipboard Landing using Infrared Vision," *IEEE Transactions on Aerospace and Electronic Systems* 38(4) (2001); see also Valasek et al., "Vision-Based Sensor and Navigation System for Autonomous Air Refueling," *Journal of Guidance, Control, and Dynamics* 28(5) (2005; see also Courbona et al., "Vision-Based Navigation of Unmanned Aerial Vehicles," *Control Engineering Practice* 18(7) (2010); and see Kong et al. "Feature Based Navigation for UAVs," *IEEE/RSJ International Conference on Intelligent Robots and Systems* (2006), among others. Others use image subtraction to identify and track multiple moving targets. See e.g. Jing et al., "Multi-Target Detection and Tracking from a Single Camera in Unmanned Aerial Vehicles (UAVs)," *IEEE/RSJ International Conference on Intelligent Robots and Systems (IROS)* (2016). Others use different feature detection algorithms for vehicle position estimation with the help of an image matching (IMMAT) technique. See e.g. Wessel et al., "Registration of Near Real-Time SAR Images by Image-to-Image Matching," *International Archives of Photogrammetry, Remote Sensing and Spatial Information Sciences* (2007); see also Luiz et al., "Exploiting Attitude Sensing in Vision-Based Navigation for an Airship," *Journal of Robotics* 2009 (2009). Image-based navigation is not possible in all weather and lighting conditions, but still offers a viable alternative and GPS backup when available.

Provided here is a method and apparatus for conducting Image-Matching (IMMAT) Navigation using location referenced aerial images in conjunction with elevation data correlated with the aerial images. The method and apparatus utilizes a library of existing aerial imagery such as satellite imagery where points on the imagery are referenced to a coordinate system, such as geographic satellite imagery referenced to a LAT/LON system, Universal Transverse Mercator (UTM) system, or some other system. The method and apparatus estimates the position of an aerial vehicle by conducting image registration between a camera image and the reference aerial images to obtain a perspective transform, then refines the estimate through comparison of points projected using the perspective transform with points generated purely through consideration of the inherent image coordinate system of the image capturing camera.

These and other objects, aspects, and advantages of the present disclosure will become better understood with reference to the accompanying description and claims.

SUMMARY

The disclosure provides a method and apparatus for conducting Image-Matching (IMMAT) Navigation using location referenced aerial images typically in conjunction with elevation data correlated with the aerial images. The method and apparatus utilizes a library of existing aerial imagery such as satellite imagery where points on the imagery are referenced to a coordinate system, such as geographic satellite imagery referenced to a latitude and longitude (LAT/LON) or Universal Transverse Mercator (UTM) system. In a typical embodiment, the disclosure further utilizes existing data to establish an elevation for each imaged point.

The disclosure estimates the position of an aerial vehicle transiting over terrain through a combination of steps combining image registrations and the inherent image coordinate system of the camera. The method places an aerial vehicle over a terrain where the terrain has been captured in existing aerial imagery, captures an image using the properly calibrated camera of the aerial vehicle to obtain a camera image, extracts features (edges, corners, blobs, ridges, etc.) from both the camera image and the existing aerial imagery, and conducts an image registration between the camera image and the existing aerial imagery to determine a perspective transform between the images (a primary matching error minimization procedure). The method further projects a plurality of image reference points (for example, imaged features and/or the corners and center of a rectangular field-of-view (FOV), and/or midpoints of FOV sides, etc.) onto the existing aerial imagery with the perspective transform and utilizes elevation data to generating a corresponding estimated (i.e. three dimensional (3D)) coordinate on the aerial imagery for each reference point. The methodology then estimates a camera position and orientation necessary for the camera to obtain the initial camera image by projecting reference points with locations defined by the image coordinate system of the camera to define terrain points, and conducting an optimization to minimize displacements between the estimated coordinates and the terrain coordinates. The estimated camera position determined through this minimization provides a location for the aerial vehicle over the actual terrain when the camera image was captured. Among other advantages, the methodology compensates for accuracy limitations in the conducted image registration by using the digital elevation map and secondary matching error minimization procedure.

The novel method, apparatus, and principles of operation are further discussed in the following description.

Figure 1:
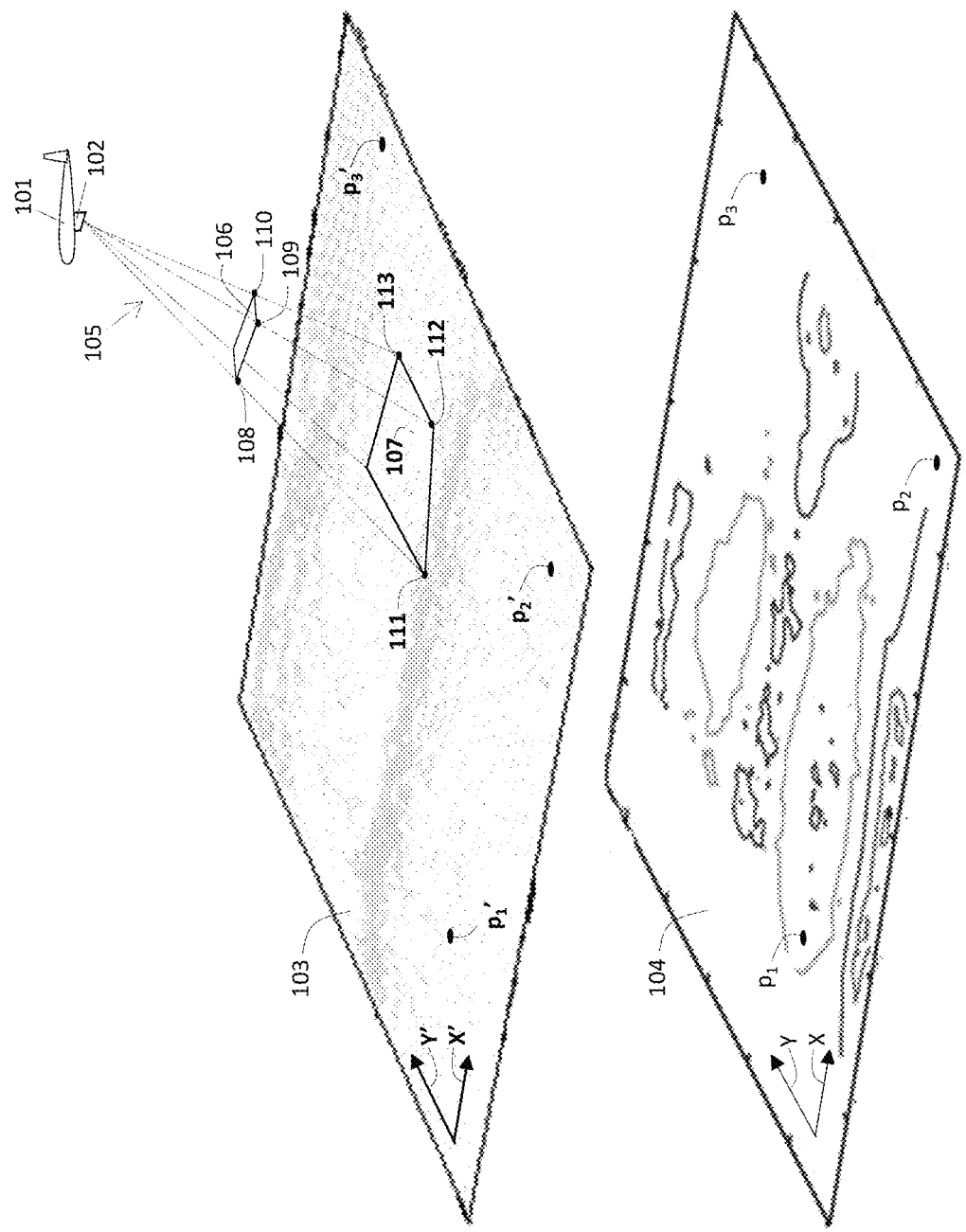
FIG. 1 illustrates an embodiment of the method and apparatus.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an method and apparatus for the location and navigation of an aerial vehicle over a planetary terrain.

The disclosure provides a method and apparatus for conducting Image-Matching (IMMAT) Navigation using location referenced aerial images in conjunction with elevation data correlated with the aerial images. The method and apparatus utilizes a library of existing aerial imagery such as satellite imagery where points on the imagery are referenced to a coordinate system, such as geographic satellite imagery referenced to a latitude and longitude (LAT/LON) system, Universal Transverse Mercator (UTM) system, or some other system by which points comprising the imagery are located on two-dimensional (2D) coplanar X and Y coordinates. The method and apparatus allows estimation of the position of an aerial vehicle comprising a camera, with the camera defining a field-of-view and defining reference points fixed within the field-of-view according to, for example, the image coordinate system present in the camera. In a typical embodiment, the reference points may be represented by the corners and the center of a rectangular FOV and/or midpoints of FOV sides and/or some found and properly registered imaged features that have relatively large dispersion to assure accuracy of defining their elevation.

As discussed further below, the method and apparatus estimates the position of the aerial vehicle transiting over terrain through a combination of steps combining image registrations and the inherent image coordinate system of the camera. In brief, the methodology places an aerial vehicle over a terrain where the terrain has been captured in existing aerial imagery, captures an image using the camera of the aerial vehicle to obtain a camera image, extracts features (edges, corners, blobs, ridges, etc.) from both the camera image and the existing aerial imagery, and conducts an image registration between the camera image and the existing aerial imagery to determine a perspective transform between the images. Subsequently, the methodology projects a plurality of image reference points onto the existing aerial imagery with the perspective transform, incorporates digital elevation data, and generates a corresponding estimated coordinate on the aerial imagery for each reference point. The methodology proceeds to further refine the perspective transform produced from the image registration by conducting an optimization to find a camera position whereby a projection of the reference points as defined by the image coordinate system of the camera has a minimized error when compared to the corresponding estimated coordinates generated through the use of the perspective transform resulting from the image registration and digital elevation data. The estimated camera position determined through this minimization provides a location for the aerial vehicle over the actual terrain when the camera image was captured.

Among other advantages, the methodology compensates for accuracy limitations in the conducted image registration by using the digital elevation map and secondary matching error minimization procedure dependent on the image coordinate system inherent to the camera. As is understood, the accuracy of the initial perspective transform estimate determined through the image registration is necessarily reliant on the effectiveness of the feature extraction and other processes required, as well as the correlative abilities of the image registration method employed. This disclosed methodology provides a manner by which this initial perspective transform is refined through comparison of points projected using the initial perspective transform with points generated purely through consideration of the inherent image coordinate system of the image capturing camera.

As an example, FIG. 1 illustrates an aerial vehicle 101 comprising a camera 102 and transiting over an actual, planetary terrain 103. Additionally illustrated is a reference image 104 depicting planetary terrain 103. Reference image 104 comprises a plurality of imaged feature points such as $p_1$, with a location of each imaged point comprising reference image 104 defined by coordinates on coplanar X and Y axes, such as those illustrated. The imaged feature point $p_1$ is one or more pixels representing an imaged portion of planetary terrain such as $p_1'$. The point $p_1'$ similarly has a location on planetary terrain 103 defined by coordinates on coplanar X' and Y' axes, and locations defined by the X and Y axes of reference 104 can be mapped to the X' and Y' axes of planetary terrain 103. Reference images such as 104 depicting terrain such as 103 and mapped to the depicted terrain are known in the art. For example, reference image 104 might be obtained from satellite imagery provided by a source such as DIGITAL GLOBE, SPOT IMAGE, or other sources providing imagery of terrains referenced to a coordinate system having at least two axes, such as the UTM system, or be generated using some other known methodology.

Camera 102 comprising aerial vehicle 101 is oriented toward planetary terrain 103 and defines a field-of-view generally indicated at 105. As is understood, the field-of-view is a solid angle through which an image sensor is sensitive to electromagnetic radiation such as light, and is an inherent feature for a given camera depending on the focal length of the lens comprising the camera. At FIG. 1, camera 102 is oriented to capture a camera image of a section of planetary terrain 103 within a projected FOV 107. In addition, a positive image plane 106 is depicted within field-of-view 105 with exemplary reference points 108, 109, and 110 present within positive image plane 106. The location of each of the reference points 108, 109, and 110 within positive image plane 106 of camera 102 is defined by an image coordinate in the image coordinate system intrinsic to camera 102. Additionally, the projection of reference points 108, 109, and 110 onto planetary terrain 103 are illustrated as terrain coordinates 111, 112, and 113 respectively. Such terrain coordinates corresponding to specific reference points within a field-of-view may be determined using the image coordinate system intrinsic to camera 102 and the location and orientation of camera 102 relative to the planetary terrain 103. Alternately, when terrain coordinates such as 111, 112, and 113 are identified, a location and orientation of a given camera sufficient to establish the terrain coordinates may be identified, when the locations of the specific reference points 108, 109, and 110 are fixed within the field-of-view and located with the image coordinate system inherent to the camera.

As discussed here, a "reference point" means a point having a location referenced to an image plane of a specific camera with the location defined by the image coordinate system inherent to the specific camera. The use of reference points having such characteristics are well known in the art. In typical digital cameras, the locations are defined according to a pixel coordinate system referenced to the stable coordinate system of the camera's image sensor. In analog camera systems, typically fiducial marks are used, which appear at substantially the same point on the image plane relative to the camera central axis. Because the reference points are defined inherently with respect to the camera, a group of reference points projected onto a terrain image can be utilized to determine a pose (position and orientation) of the camera based on the reference point projection. Within this disclosure, projection of the reference points in this manner as compared to the estimated reference point location as a result of an image registration provide the optimization through which a location of an aerial vehicle is estimated.

The methodology disclosed here determines the position of an aerial vehicle over a planetary terrain by obtaining a reference image 104 of the planetary terrain 103, where reference image 104 comprises a plurality of imaged points such as $p_1$, and where the location of each imaged point is defined in the reference image by an X coordinate on and X axis and a Y coordinate on a Y axis. In an embodiment, each imaged point comprises one or more pixels imaging some portion of the planetary terrain, and typically the X and Y axes are coplanar with the reference image. The methodology subsequently extracts a plurality of reference image features from the imaged points and associates each reference image feature with at least one X coordinate and at least one Y coordinate.

The methodology further establishes aerial vehicle 101 over planetary terrain 103. The methodology subsequently orients camera 102 toward planetary terrain 103 and operates the camera to capture a camera image of planetary terrain 103. This action generates a first image reference point, a second image reference point, and a third image reference point in the camera image. The first image reference point is the portion of the resulting camera image corresponding to the image coordinate of the first reference point, as defined by the image coordinate system of camera 102. Similarly, the second image reference point is the portion of the resulting camera image corresponding to the image coordinate of the second reference point, and the third image reference point is the portion of the resulting camera image corresponding to the image coordinate of the third reference point. The capture of the camera image further generates an image of the section of planetary terrain 103 within a projected field-of-view of the camera, such as projected FOV 107. The methodology subsequently extracts a plurality of camera image features from the camera image, for comparison with the plurality of reference feature images extracted from the reference image. Using the plurality of reference image features and the plurality of camera image features, the methodology conducts the first step of image registration to match the features and determine a perspective transform between the reference image and the captured camera image. Subsequently, the second step of refining this camera's pose begins.

As discussed here and referenced above, an "image reference point" means an portion of a captured camera image where the portion comprises imagery depicting that portion of the camera's field-of-view defined by a specific reference point. For example, when a specific reference point is located in the field-of-view of a digital camera by a specific image coordinate in an image coordinate system referenced to for example the CCD of the digital camera, the image reference point corresponding to the specific reference point in a captured image comprises the pixel of the captured image generated by the CCD at the specific image coordinate. The image reference point as used here thereby refers to a portion of a captured image where the portion represents imaging of the location where the specific reference point resides within the camera's field-of-view. In a typical embodiment, reference points within a camera's rectangular field-of-view may be designated by the corners of the field-of-view and its center, and the corresponding image reference points are the imaged portions at the corners and the center of the captured image.

Figure 2:
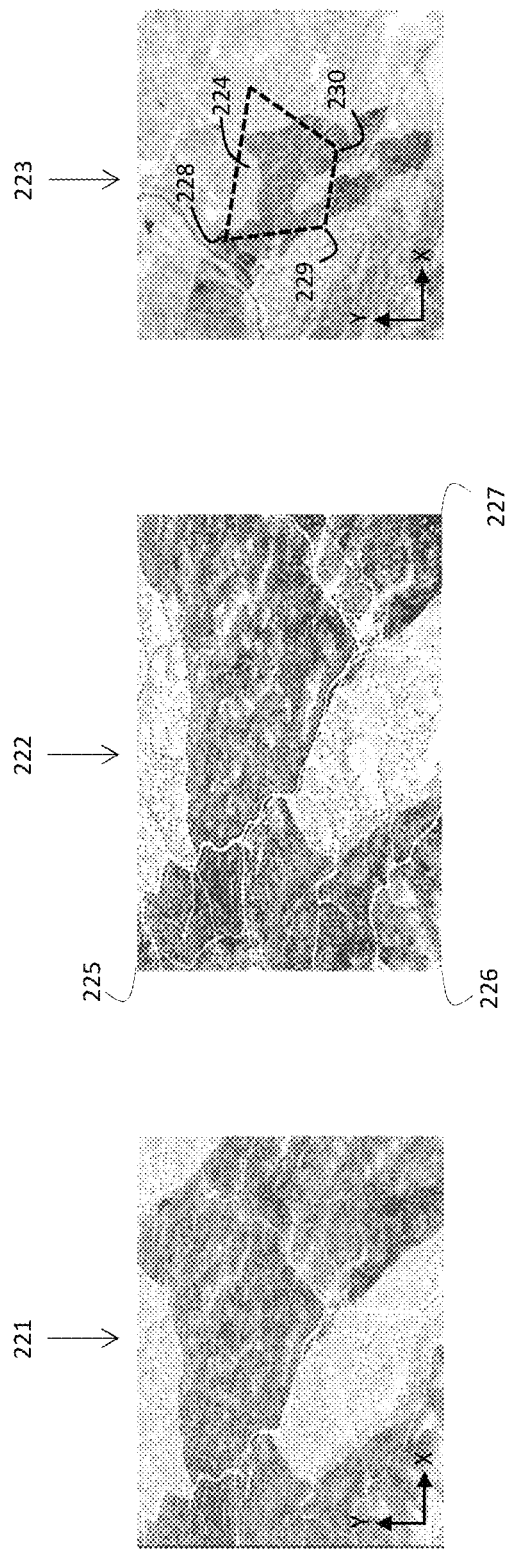
FIG. 2 illustrates exemplary reference and camera images.

As discussed, the methodology disclosed conducts the first step of an image registration and determines a perspective transform between the reference image and the captured camera image. As a subsequent step, the method subsequently utilizes this perspective transformation to locate a first estimated coordinate on the reference image corresponding to the first image reference point of the camera image, a second estimated coordinate on the reference image corresponding to the second image reference point of the camera image, and a third estimated coordinate on the reference image corresponding to the third image reference point of the camera image, and so on for additional image reference points as applicable. As an example, FIG. 2 illustrates a portion of a reference image obtained by satellite and depicting a geographic terrain as 221, and additionally illustrates a camera image captured by an aerial vehicle transiting over the geographic terrain as 222. Within the methodology disclosed, features are extracted from each image and correspondence features determined in order to conduct the first step of image registration, with the results illustrated as 223. Image 223 illustrates the reference image depicted at 221 with the field of view of the camera that captured image 222 indicated by the irregular convex quadrilateral shape 224.

At FIG. 2, a first image reference point 225, a second image reference point 226, and a third image reference point 227 are additionally indicated at the corners of camera image 222. These image reference points correspond to the reference points defined by the imaging coordinate system of the camera, such as first reference point 108, second reference point 109, and third reference point 110 of camera 102. These image reference points are effectively transferred to the reference image during image registration and a location of each image reference point is ascertained using the coordinate system of the reference image and planetary terrain, in order to define an estimated coordinate. For example at FIG. 2, based on the perspective transform of the image registration process, first image reference point 225 is located at first estimated coordinate 228, second image reference point 226 is located at second estimated coordinate 229, and third image reference point 227 is located at third estimated coordinate 230, based on the X-Y axes of the geographic terrain depicted by images 221 and 223.

As discussed here and referenced above, an "estimated coordinate" of an image reference coordinate comprising a camera image means the corresponding location of the image reference coordinate on a reference image, with the corresponding location referenced to at least the X axes and the Y axes of the reference image, and where the corresponding location is determined using the 2D-to-2D perspective transform resulting from the first step of image registration of the camera image and the reference image. Because the location of these estimated coordinates are determined using the 2D-to-2D perspective transform, they are subject to any inaccuracies which manifest during the first step of image registration methodology used to establish the perspective transform. The methodology disclosed subsequently mitigates these inaccuracies and refines the transform by determining a camera position over the 3D planetary terrain from which a projection of the reference points defined by the image coordinate system of the camera and the elevation data minimizes an error based on the estimated coordinates determined using the image reference points and the perspective transform.

Figure 3:
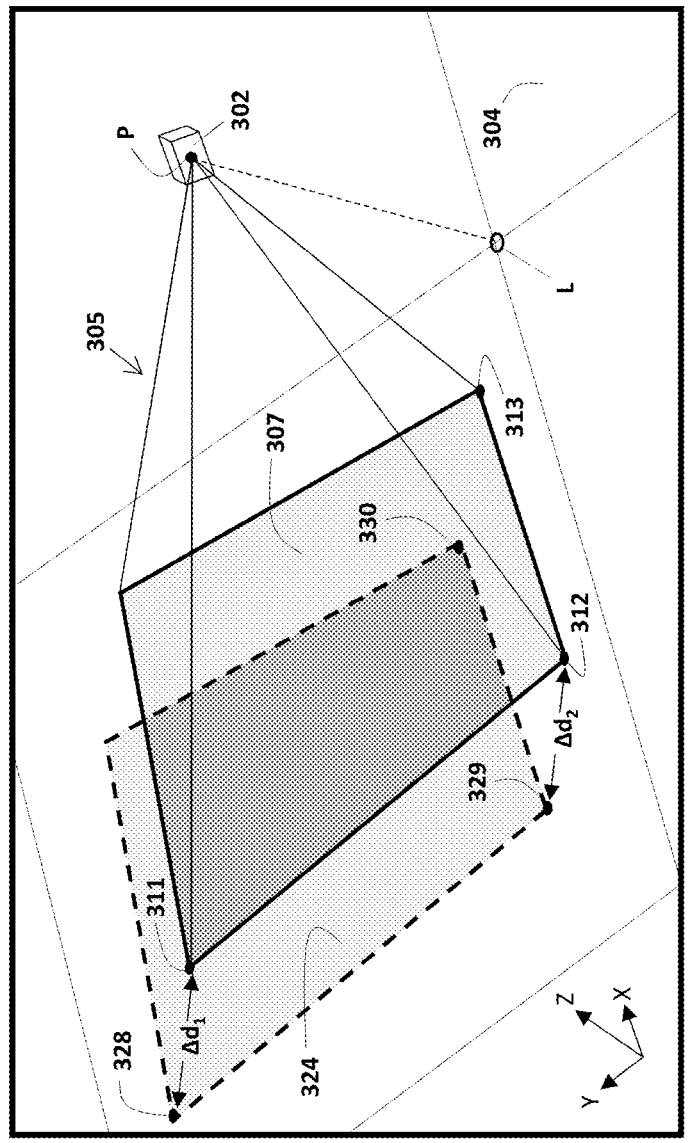
FIG. 3 illustrates a comparison between estimated coordinates and terrain coordinates.

As an example, FIG. 3 illustrates a first estimated coordinate 328 generated by locating the first imaged coordinate 228 of FIG. 2 on reference image 304 using the perspective transform resulting from the first step of image registration. Similarly illustrated are second estimated coordinate 329 generated by locating second imaged coordinate 229 on reference image 304, and third estimated coordinate 330 generated by locating third imaged coordinate 230 on reference image 304. The camera image captured and registered against the reference image is represented as the area 324. Each of first estimated coordinate 328, second estimated coordinate 329, and third estimated coordinate 330 are located with respect to at least the X-Y axes defining locations on reference image 304. In certain embodiments, each estimated coordinate is further located on a Z axis perpendicular to the X and Y axes utilizing a digital georeferenced elevation map.

The methodology disclosed compensates for accuracy limitations in the conducted 2D-to-2D image registration by determining a necessary camera location and orientation which minimizes displacements between the specific estimated coordinates described above and corresponding terrain coordinates, where the corresponding terrain coordinates are projected to the reference image and located based on the inherent image coordinate system of the camera. Minimizing the displacement between such estimated coordinates achieved via image registration and terrain coordinates achieved via spatial manipulation of the image coordinate system of a camera allows for greater accuracy in the image matched navigation system disclosed.

For example, FIG. 3 additionally illustrates a camera 302 located at some position P with respect to the X-Y-Z axes. As previously discussed, camera 302 defines a first reference point, a second reference point, and a third reference point having locations within its field-of-view 305 by the image coordinate system of camera 302. A first terrain coordinate 311 corresponds to the first reference point, a second terrain coordinate 312 corresponds to the second reference point, and a third terrain coordinate 313 corresponds to the third reference point, based on the assumed orientation of camera 302 at the position P. A resulting displacement between the first estimated coordinate 328 (based on the perspective 2D-to-2D transform) and first terrain coordinate 311 (based on the assumed location P and the image coordinate system of camera 302) is illustrated as $\Delta d_1$. An additional displacement $\Delta d_2$ is present between second estimated coordinate 329 and second terrain coordinate 312, and a further displacement $\Delta d_3$ (not shown) is present between third estimated coordinate 330 and third terrain coordinate 313. The methodology disclosed determines an estimated position of the camera by refining the position P, obtained at the first step of image registration, to accommodate the displacements such as $\Delta d_1$, $\Delta d_2$, and $\Delta d_3$. In an embodiment the displacements are substantially minimized. Having refined the position P, the estimated location of an aerial vehicle comprising the camera 302 can be established on the X-Y axes of reference image 304 as a location L, which may be correlated to an actual location on the planetary terrain over which the aerial vehicle transits.

Refining the position P further results in determining a necessary camera orientation about the X axis, the Y axis, and the Z axis. In particular embodiments, when the camera image is captured, a position of the camera with to respect to the body fixed coordinate system of the aerial vehicle is established. For example, the camera image might be captured with the camera exhibiting a specific pitch, roll, and yaw in the body fixed coordinate system of the aerial vehicle. In these embodiments, the attitude of the aerial vehicle may be subsequently established at the time the camera image was captured using the determined camera orientation with respect to the X axis, the Y axis and the defined position of the camera within the body fixed coordinate system of the aircraft.

As used here, a "terrain coordinate" corresponding to a specific reference point, means a location on a reference image which images a specific location on the planetary terrain, where the specific location on the planetary terrain comprises an intersection of a projection of the specific reference point from a particular location and particular orientation of a specific camera, and where the location of the specific reference point is defined by the image coordinate system of the specific camera. The plurality of reference points with the now known 3D terrain coordinates and their corresponding reference points on the image allows a trilateration procedure. See Yakimenko et al., "Unmanned Aircraft Navigation for Shipboard Landing using Infrared Vision," *IEEE Transactions on Aerospace and Electronic Systems* 38(4) (2002).

Determination of the estimated position of the camera where the displacements between an estimated coordinate and a corresponding terrain coordinate are minimized may be conducted using means known in the art. In a particular embodiment the determination comprises an optimization through which the camera posture and aerial position are estimated by minimizing an error function $E(\Delta d_i)$, i=1, 2, 3, . . . , where the error function $E(\Delta d_i)$ comprises a displacement between a first terrain coordinate and the first estimated coordinate, a displacement between a second terrain coordinate and the second estimated coordinate, and a displacement between a third terrain coordinate and the third estimated coordinate. For example, an applicable error function $E(\Delta d_i)$ might be an error sum of squares $\Sigma_i \|\Delta d_i\|^2$, where each $\Delta d_i$ is a difference between an estimated coordinate and corresponding terrain coordinate as illustrated at FIG. 3. In other embodiments, the error function $E(\Delta d_i)$ might be an $L_1$ norm, an infinity norm, or some other error function $E(\Delta d_i)$ comprising at least a $\Delta d_1$, $\Delta d_2$, and $\Delta d_3$ as described herein. In a particular embodiment, the error function $E(\Delta d_i)$ is selected such that an absolute value of the error function $E(\Delta d_i)$ decreases as a summation of the individual errors $\Delta d_i$ comprising the error function decreases. Optimization methodologies applicable to minimizing such an error function are well known in the art. See e.g. K. V. Mital, *Optimization Methods in Operations Research and Systems Analysis* ($3^{rd}$, 1996); see also I. I. Eremin, *Theory of Linear Optimization* (2002); see also I. Maros, *Computational Techniques of the Simplex Method* (2003), among many others.

The method and apparatus discussed above thereby estimates the position of the aerial vehicle transiting over terrain through a combination of steps combining image registrations and the inherent image coordinate system of the camera. The methodology captures an image of planetary terrain from an aerial vehicle to obtain a camera image, extracts features from both the camera image and the existing aerial imagery of the planetary terrain, and conducts an image registration to determine a perspective transform between the images. Subsequently, the methodology projects image reference points onto the existing aerial imagery with the perspective transform to generate a corresponding terrain coordinate corresponding to each image reference point. The methodology further estimates a camera position by conducting an optimization and finding the camera position whereby terrain coordinates representing a projection of the reference points as defined by the image coordinate system of the camera generate a minimized error when compared to the corresponding estimated coordinates generated through use of the perspective transform resulting from the image registration. The estimated camera position determined through this minimization provides a location for the aerial vehicle over the actual terrain when the camera image was captured. This methodology significantly mitigates the impact of errors produced and promulgated during the image registration process through the conduct of a subsequent minimization dependent on the image coordinate system inherent to the camera.

"Image registration" as used here means the process of mapping and aligning two or more images through steps generally including feature detection, feature matching and image transformation, and resampling. As is understood, the resulting perspective transform reflects any inaccuracies which present and promulgate during the image registration process, including inaccuracies stemming from the effectiveness of corresponding feature extraction from the two images, the correlative abilities of the image registration method employed, the altered relative scaling and relative orientation of features due to differing image device orientations, and others. For example, at FIG. 1, a first camera such as a satellite camera might generate reference image 104 from an orientation substantially perpendicular to the XY plane of reference image 104 so that actual X'-Y' displacement between points on a planetary terrain such as $p_1'$, $p_2'$, and $p_3'$ scale relatively consistently between planetary terrain 103 and the corresponding $p_1$, $p_2$, and $p_3$ of reference image 104. In contrast, camera 102 might generate a camera image from a significantly different orientation as illustrated by field-of-view 105, which results in projected FOV 107 distorting the rectangular frame of positive image plane 106 into the generally trapezoidal shape shown, and significantly altering the apparent relative positional placement of points on planetary terrain 103 when projected to positive image plane 106. This distortion as well as other inaccuracies (including the limitations of a given image registration method employed) introduce error into the resulting perspective transform determined in the image registration process. See e.g. A. Goshtasby, *Theory and Applications of Image Registration*, (2017), among many others. The methodology disclosed here significantly mitigates the impact of these and other errors on the estimated perspective transform through a comparison of the aforementioned imaged points when projected using the perspective transform with the use of the aforementioned reference points within the field-of-view of the camera and located using the camera's image coordinate system.

Similarly within this disclosure, feature extraction and initial estimation of the perspective transform between the camera image and the reference image may be accomplished using various means known in the art, such as the Speeded Up Robust Features (SURF) tracker, the Scale-Invariant Feature Transform (SIFT) tracker, the Features from Accelerated Segment Test (FAST) tracker, and others. See e.g. Isik et al., "A Comparative Evaluation of Well-known Feature Detectors and Descriptors," *International Journal of Applied Mathematics, Electronics, and Computers* 3(1) (2015), and see El-gayar et al., "A comparative study of image low level feature extraction algorithms," *Egyptian Informatics Journal* 14 (2013), and see Karami et al., "Image Matching Using SIFT, SURF, BRIEF and ORB: Performance Comparison for Distorted Images," Proceedings of the 2015 Newfoundland Electrical and Computer Engineering Conference (2015), and see Neto et al., "On the Improvement of Image Feature Matching under Perspective Transformations," 23rd SIBGRAPI—Conference on Graphics, Patterns and Images (2010), among others. Similarly, feature matching may be conducted using means such as Random Sample Consensus (RANSAC) algorithms and M-estimator Sample and Consensus (MSAC) algorithms. See e.g. Fischler et al., "Random sample consensus: A paradigm for model fitting with applications to image analysis and automated cartography," *Comm. ACM* 381-395 (1981); see also Wang et al., "Robust adaptive-scale parametric model estimation for computer vision," *IEEE Trans. Pattern Anal. Mach. Intell.* 26 (2004); and see Tordoff et al., "Guided sampling and consensus for motion estimation," *Proc European Conf on Computer Vision* (2002); among others.

Reference imagery of a planetary terrain comprising a plurality of imaged points defined by an X coordinate on an X axis and a Y coordinate on a Y axis may be obtained from any existing source and using any methodology. In a specific embodiment when the planetary terrain is geographic terrain, available satellite imagery such as DIGITAL GLOBE, SPOT IMAGE, or other sources. In certain embodiments, such satellite imagery may be supplemented with existing digital elevation map data, such as that from the Advanced Spaceborne Thermal Emission and Reflection Radiometer (ASTER) Global Digital Elevation Model database. High resolution satellite images of an area of interest can be made by selecting the desired image layers and then creating a mash-up image. This image collage can then be downloaded as high-resolution tiles that can be stitched together to form a large contiguous image of the area of interest.

For efficient operation, generally a consistent set of reference frames should be used to properly describe the orientation of an aerial vehicle aircraft in three-dimensions around its own center-of-gravity, as well as for referencing its position within the coordinates of the underlying planetary terrain. In a particular embodiment, the aerial vehicle or UAV body frame of reference is body-fixed and fixed upon the center of gravity of the UAV. A typical convention has the +Z direction pointing out of the bottom of the UAV, +X direction out of the nose, and +Y in the direction of the right wing, in other words, x=north; y=east; z=down. Using this reference frame for the UAV may allow for easier mathematical transformations when computing rotations and translations with respect to the ground. Similarly, in order to estimate the location of a UAV with respect to the Earth's surface, there is a need to unambiguously reference locations on the surface of the Earth. A particular embodiment uses the Universal Transverse Mercator (UTM) Coordinate System to identify locations on the surface of the Earth, as the units correspond to meters on the ground. This method can greatly simplify the computation of distances in three dimensions. Further, available software such as 3DEM provides the capability to convert any terrain using Geodetic (latitude-longitude) projection into a UTM projection.

Figure 4:
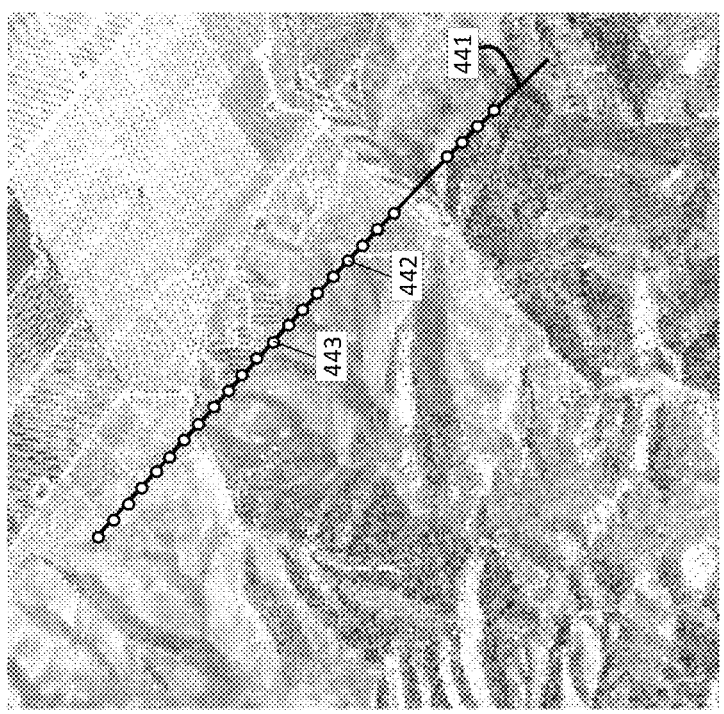
FIG. 4 illustrates a nominal trajectory of the aerial vehicle.

In certain embodiments, the method and apparatus utilizes a Reference Image Library (RIL) comprising a plurality of reference images used in conjunction with an anticipated aerial vehicle trajectory over the planetary terrain. In this embodiment, the anticipated nominal trajectory is divided into N points and, at each of those points, a series of high resolution images is extracted from the satellite images along the planned path the UAV is expected to take. For example, FIG. 4. shows a nominal trajectory 441 and divided into segments such as 442, 443, and others similarly depicted as circles. A reference image can be generated at each segment based on the nominal position of the camera and the expected pitch and yaw of the UAV at those points on the nominal trajectory. With the position and attitude information of a camera following the nominal trajectory, the center-point of the camera's viewpoint may be projected to a ground map of the planetary terrain and the high-resolution map cropped to generally the area enclosed by the camera's viewpoint. In a particular embodiment, at each designated segment on the nominal trajectory, the center-point of the camera's viewpoint is projected to the ground map along with the four corners of the camera's field-of-view, and the high-resolution map is then cropped to the area enclosed by the four corners and projectively transformed into a rectangular view to represent a notional scene of what an onboard camera might see during a fly-pass. In certain embodiments, computationally hungry image processing tasks such as feature extraction can be conducted on the reference view images (RVIs) and then stored with the RVIs in the RIL before loading it on the UAV. This reduces the number of computational cycles required onboard the UAV in flight.

In a further embodiment, an appropriate reference image frame in a pre-prepared library is selected by using an estimated position of the aerial vehicle based on, for example, the last known coordinates of the aerial vehicle dead reckoned to a particular time or an expected position on the nominal trajectory at the particular time. After the appropriate reference frame has been selected, the features for that reference frame are matched with the features extracted from the camera image captured by the onboard camera and an updated position determined using the method disclosed.

The disclosure further provides an apparatus for a location over a planetary terrain with the apparatus comprising an aerial vehicle such as 101, a camera mechanically attached to the aerial vehicle such as 102, and digital processor mechanically attached to the aerial vehicle. Camera 102 defines a field-of-view such as 105 and defines an image coordinate system, with a first reference point such as 108, a second reference point such as 109, and a third reference point such as 110 located in the field-of-view at a first image coordinate, second image coordinate, and third image coordinate respectively.

A digital processor is mechanically attached to the aerial vehicle with the digital processor in data communication with the camera. The digital processor further comprises a memory, with the memory storing a reference image of the planetary terrain. As before, the reference image comprises a plurality of imaged points where a location of each imaged point on the reference image is defined by an X coordinate on an X axis and a Y coordinate on a Y axis. The memory further comprises a plurality of reference image features extracted from the plurality of imaged points, with each reference image feature is associated with at least one X coordinate and at least one Y coordinate.

The digital processor is programmed to direct the camera to capture an image within its field-of-view and to receive the camera image from the camera. The digital processor generates a first image reference point, a second image reference point, and a third image reference point from the camera image using the image coordinate system of the camera. The digital processor additionally extracts a plurality of camera image features from the camera image and retrieves the plurality of reference image features from the memory, and generates a perspective transform between the camera image and the reference image. Using the perspective transform, the digital processor defines a first estimated coordinate for the first image reference point, a second estimated coordinate for the second image reference point, and a third estimated coordinate for the third image reference point, and determines an estimated camera position by minimizing a displacement between the estimated coordinates and corresponding terrain coordinates, using a methodology as previously discussed.

In certain embodiments, the apparatus estimates a location of the aerial vehicle and estimates an orientation of the camera, and retrieves a specific reference image from a plurality of reference images from the memory based on the estimated location and the estimated orientation. In another embodiment, the processor generates the estimated location and camera orientation based on one or more trajectory points comprising a planned trajectory stored in the memory. In a further embodiment, a reference image library comprising a plurality individual reference image features for each individual reference image is stored in the memory, and the processor retrieves the applicable plurality of individual reference features for the image registration with the camera image based on at least the estimated position of the aerial vehicle.

DESCRIPTION OF A SPECIFIC EMBODIMENT

Figure 5:
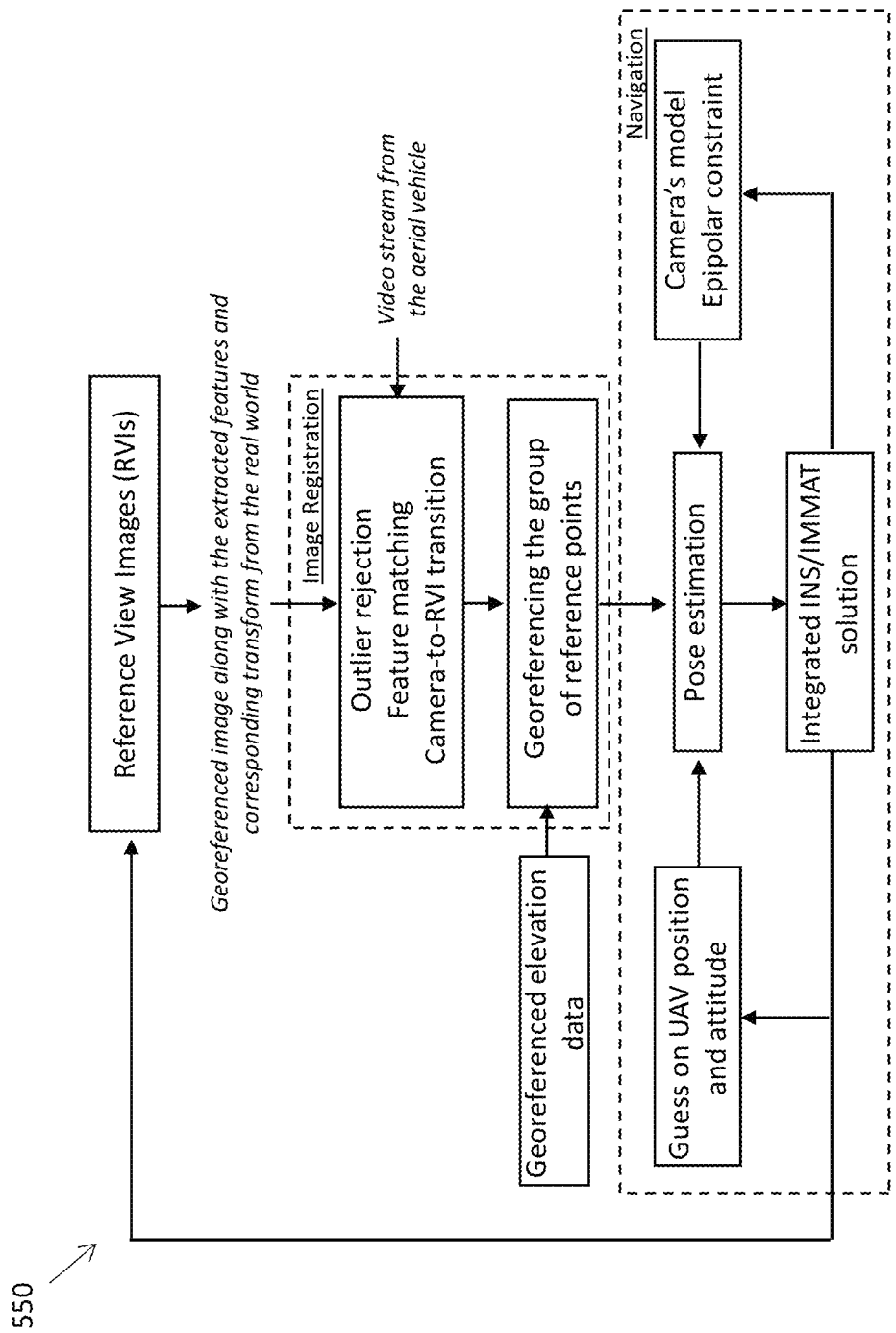
FIG. 5 illustrates an embodiment of the methodology employed.

The overall concept of the suggested IMMAT navigation fix algorithm is presented graphically in FIG. 5 and indicated generally by 505. The computational procedure presented in FIG. 5 involves several steps. Depending on the platform and available computational resources, some of the steps may be executed off-line, before the flight. These off-line steps lead to the creation of a reference image library (RIL) to be used in flight. These steps are generally:
1) Defining the nominal trajectory/operating area (anticipated trajectory/area of operation);
2) Acquiring satellite imagery (2D or 3D) covering the intended area of operation;
3) Geo-referencing the satellite photo images to the local tangent plane (Universal Transverse Mercator (UTM) coordinate system);
4) Selecting several (N) locations along the nominal trajectory that will be included in RIL;
5) Generation of the set of reference view images (RVIs) at those N locations as expected to be seen by an onboard sensor (which may or may not be warped/rotated to replicate the expected point of view of the sensor);
   Saving the perspective transformation between the world and RVI coordinate systems—Pre-processing RVIs to detect image features (edges, corners, blobs, ridges).
   Loading found features and transform data along with N RVIs onto the aerial vehicle as RIL.

Once the RIL for an upcoming mission has been created it can be used onboard. The pose estimates during the actual flight can then be obtained using the following routine:
1) Select the appropriate RVI (one of N) corresponding to an assumed position of an aerial vehicle (coordinates based or time-based)
2) Begin analyzing imagery from the onboard optical sensor, and perform lens correction adjustments
3) Match features between the appropriate RVI and the onboard sensor image
4) Estimate the perspective transform between the onboard sensor x-y coordinates and RVI's reference coordinates
5) Use the RVI's x-y pixel position—UTM coordinate transform and elevation map to determine the geographic coordinates of a plurality of chosen reference points, for example the four corners of the onboard sensor's current field of view (FoV)
6) Choose initial conditions for the 6DoF pose estimation algorithm (six varied parameters)
   use the predicted estimate of the aerial vehicle position and orientation from the nominal trajectory and current time of flight (use the INS/IMMAT navigation solution), or
   use the previous filtered 6DoF estimate (previous IMMAT solution)
7) Project a plurality of chosen reference points, for example the four corners of the estimated FoV for the current values of varied parameters onto the ground
8) Compare the difference between the estimated and actual coordinates of a plurality of chosen reference points, for example the four corners
9) Repeat Steps 6-8 until this difference is minimized to some reasonable accuracy
10) Convert the found orientation on the visual sensor into the orientation of the aerial vehicle, i.e. account for the cameras orientation with respect to the aircraft.

In other words, the goal of the onboard algorithm is to find where the corners of the real-flight image are located on the satellite image, then perform reverse geo-referencing to find their geographical locations, and finally execute an optimization to estimate the best possible location and orientation of the camera that would create such a footprint on the satellite image, i.e. assess the values of $x_c$, $y_c$, $z_c$, $\varphi_c$, $\psi_c$, $\theta_c$ (three Cartesian coordinates and three Euler angles). The algorithm relies on the fact that there are enough feature matches found between the RVI and the camera image to establish the transform between the two images. FIG. 2 shows an example of the image as seen by the UAV's onboard camera as 221, the RVI used for image registration as 223, and the outline of the seeker image superimposed (registered) onto the satellite image as 224. When the superimposed image gets closer to the RVI's edge, the algorithm switches to another (overlapping) RVI as depicted by the feedback loop coming out of integrated INS/IMMAT navigation block in FIG. 4.

There exists many cloud-based platforms providing access to high resolution (HR) geospatial data collected by commercial satellites orbiting around the Earth. In this study, it was found that the most accurate library of Earth imagery and analytics are provided by DIGITALGLOBE (formerly GEOEYE) in the U.S. and SPOT IMAGE in Europe. Here, the RIL was created using DIGITALGLOBE's geospatial big data (GBDX) platform that provides access to 15 years' worth of geo spatial data (80+ petabytes) along with the tools and algorithms necessary to extract useful information from that data.

The process for downloading reference imagery using DIGITALGLOBE is simple once access has been granted. Aerial images of any area of interest can be made by selecting the desired image layers and creating a mashup image. These mashup images are downloaded as tiles, but can be stitched together to form large continuous images for generating the RIL using MATLAB image processing software. In this study, an RIL was constructed consisting of RVIs that were about one week old compared to the imagery coming from the aerial vehicle. Each RVI pixel represents a 50 cm by 50 cm square on the ground Two aerial platforms were utilized: an unmanned Tier-2 Arcturus T-20 aerial vehicle, and a manned Cessna-206, both equipped with the TASE 200 sensor, which is a compact lightweight Electro-Optical (EO)/infrared (IR) imaging system. The EO camera is a standard-definition (SD) (640 pixels by 480 pixels) daylight camera with continuous optical zoom of up to 31×, horizontal FoV (HFoV) of 55.7° to 1.94°. The IR sensor is a long wave SD resolution camera with two zoom settings corresponding to HFoV of 10.5° and 5.27°. For the sake of proper comparison most of the flights were conducted with a fixed zoom setting corresponding to HFoV=10.5° for both EO and IR cameras. The TASE sensor also features electronic image stabilization embedded GPS/IMU (inertial measurement unit), sensors recording TASE sensor parameters (including the mount and gimbal attitude) at about 30 Hz rate (i.e. for each frame), several pointing options including fixed (to an aircraft) tilt and pan angles, scene steering, and target tracking.

In the exemplary flights, the gimbal's pan and tilt functions (with respect to an aircraft) were fixed to 0° and −45°, respectively. Flights were conducted at different altitudes and aircraft attitudes in the restricted airspace R-2504 West of Paso Robles, Calif. with a varying terrain elevation of about 300 m and West of King City, Calif. with a more or less constant terrain elevation of 100 m.

Using video data resources as described above, the IMMAT navigation algorithm as outlined in Section 2 was tested in computer simulations. The following presents a typical performance achieved in this preliminary study for one of the UAV flights over the varying-height terrain.

For image registration (building a transform for pixel coordinates between the RVI and the on-board sensor image), the IMMAT navigation algorithm used the speeded-up-robust features (SURF) finding algorithm. It should be noted, however, that it is very easy to replace this algorithm with any other algorithm (like SIFT, ORB, BRISK, FAST, FREAK, HARRIS, MinEigen, MSER, HOG, Kaze,) that would assure the best performance for a specific application.

The IMMAT algorithm relies on having a sufficient number of matches between the RVI and the camera image. In several simulations, this number was typically around 100-200 matches, but not lower than 20. It appears that even with only 20 matches the IMMAT based pose estimation algorithm worked relatively well. At lower altitudes (below 0.6 km), the ground-spatial distance was found to be a limiting factor in the feature matching's performance.

In a typical example, the position estimates exhibited biases of −30 m, 191 m and 53 m in the East, North and Up direction, raw data deviations (1σ) of 88 m (East), 39 m (North) and 38 m (Up) with a total positional deviation of 104 m, and smoothed data deviations (1σ) of 62 m (East), 18 m (North) and 19 m (Up) with a total positional deviation of 67 m. Attitude matching exhibited better performance with excellent match in roll and yaw, relatively large bias in the pitch direction (possibly due to erroneous tilt recording), unfiltered error biases of −1.9° (roll), −6.9° (pitch) and 0.5° (yaw), and unfiltered deviation (1σ) of −3.5° (roll), −3.1° (pitch), and 2.1° (yaw).

With heading generally at a NNE (about 10°), most of the position error in this particular example occurred in the north direction. Also, there is a strong correlation with the easting error. A pitch recording error is believed to be a primary source of the position error. It was also generally observed that performance is better at higher altitudes. This is because the best performance is achieved when the level of details for the camera image is closer to that of RVI. Preliminary results indicate that unfiltered position estimates are accurate to the order of roughly 100 m when flying at 2 km above the surface and unfiltered orientation estimates are accurate to within a few degrees.

Thus, described here is a method and apparatus for conducting Image-Matching (IMMAT) Navigation using location referenced aerial images in conjunction with elevation data correlated with the aerial images. The method and apparatus utilizes a library of existing aerial imagery such as satellite imagery where points on the imagery are referenced to a coordinate system, such as geographic satellite imagery referenced to a LAT/LON system, Universal Transverse Mercator (UTM) system, or some other system by which points comprising the imagery are located on a coplanar X and Y coordinate. The method and apparatus allows estimation of the position of an aerial vehicle comprising a camera, with the camera defining a field-of-view and defining reference points fixed within the field-of-view according to, for example, the image coordinate system present in the camera.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of determining the position of an aerial vehicle over a planetary terrain comprising:
   generating a plurality of reference image features by:
      obtaining a reference image of the planetary terrain where the reference image of the planetary terrain comprises a plurality of imaged points where a location of each imaged point on the reference image is defined by an X coordinate on an X axis and a Y coordinate on a Y axis where the X axis and the Y axis are coplanar in an XY plane; and
      extracting the plurality of reference image features from the plurality of imaged points and associating each reference image feature with at least one X coordinate on the X axis and at least one Y coordinate on the Y axis, thereby generating the plurality of reference image features;
   generating a perspective transform by:
      placing the aerial vehicle over the planetary terrain, where the aerial vehicle comprises a camera and where the camera defines a field-of-view and defines an image coordinate system defining locations within the field-of-view;
      operating the camera to capture an image of the planetary terrain within the field-of-view of the camera, thereby generating a camera image;
      extracting a plurality of camera image features from the camera image; and
      determining the perspective transform between the camera image and the reference image by conducting an image registration of the camera image and the reference image using the plurality of reference image features and the plurality of camera image features, thereby generating the perspective transform;
   defining planetary coordinates of a plurality of image reference points by:
      choosing a plurality of image reference points within the camera's field-of-view where each image reference point is a portion of the camera image corresponding to an image coordinate comprising the image coordinate system of the camera, such that the each image reference point has a corresponding image coordinate;
      ascertaining a location of every image reference point on the reference image using the perspective transform and defining the location of the every image reference point on the reference image using the X axis and the Y axis of the reference image;
      delineating a Z axis where the Z axis intersects the XY plane at a single point; and
      establishing a coordinate on the Z axis for each individual image reference point; and
      defining an estimated coordinate for the each individual image reference point where the estimated coordinate for the each individual image reference point comprises the location of the each individual image reference point on the reference image and the coordinate on the Z axis for the each individual image reference point, and correlating the estimated coordinate for the each individual image reference point with the image coordinate corresponding to the each individual image reference point;

determining an estimated camera position on the X axis, the Y axis, and the Z axis and a camera orientation about the X axis, the Y axis, and the Z axis by minimizing an error function, where the error function comprises a plurality of displacements where each displacement is a displacement between a specific terrain coordinate and each specific estimated coordinate, where the specific terrain coordinate is a projection of the image coordinate correlated with the specific estimated coordinate from the estimated camera position and the camera orientation to the reference image, and where the projection of the image coordinate correlated with the specific estimated coordinate is a function of the image coordinate system of the camera, the estimated camera position, and the camera orientation; and determining the position of the aerial vehicle over the planetary terrain based on the estimated camera position on the X axis, the Y axis, and the Z axis and the camera orientation about the X axis, the Y axis, and the Z axis.

2. The method of claim 1 further comprising;

determining a position of the camera with to respect to a body fixed coordinate system of the aerial vehicle when the camera captures the image of the planetary terrain; and estimating an attitude of the aerial vehicle using the camera orientation about the X axis, the Y axis, and the Z axis and the position of the camera with to respect to the body fixed coordinate system of the aerial vehicle when the camera captures the image of the planetary terrain.

3. The method of claim 1 further comprising:

estimating a location of the aerial vehicle over the planetary terrain and estimating an orientation of the camera comprising the aerial vehicle at the location, thereby generating an estimated location and an estimated orientation; and obtaining the reference image of the planetary terrain by selecting a specific reference image from a plurality of reference images based on the estimated location and the estimated orientation.

4. The method of claim 3 further comprising:

placing the aerial vehicle over the planetary terrain by:
determining a planned trajectory of the aerial vehicle over the terrain, where the planned trajectory comprises one or more trajectory points where each trajectory point is associated with an individual X coordinate on the X axis, an individual Y coordinate on the Y axis, and an individual Z coordinate on the Z axis; and directing the aerial vehicle to execute the planned trajectory over the terrain, thereby placing the aerial vehicle over the planetary terrain; and generating the estimated location and the estimated orientation based on a trajectory point comprising the planned trajectory of the aerial vehicle over the terrain.

5. The method of claim 3 further comprising extracting a plurality of individual reference image features from each individual reference image comprising the plurality of reference images and using the plurality of individual reference image features as the plurality of reference image features when the each individual reference image is used as the specific reference image.

6. The method of claim 5 where extracting the plurality of reference image features comprises storing the plurality of individual reference image features for the each individual reference image in a memory comprising the aerial vehicle, and where conducting the image registration of the camera image and the reference image using the plurality of reference image features and the plurality of camera image features comprises retrieving the plurality of individual reference image features for the each individual reference image from the memory comprising the aerial vehicle when the each individual reference image is used as the specific reference image.

7. The method of claim 6 further comprising:

communicating the camera image from the camera to a digital processor where the digital processor comprises the aerial vehicle and where the digital processor is in data communication with the camera and in data communication with the memory;

extracting the plurality of camera image features from the camera image using the digital processor;

communicating the plurality of individual reference image features from the memory using the digital processor; and using the digital processor to conduct the image registration of the camera image and the reference image and thereby determine the perspective transform by using the plurality of individual reference image features as the plurality of reference image features and using the each individual reference image as the reference image.

8. The method of claim 7 further comprising communicating the image coordinate system of the camera and the image coordinate corresponding with the each image reference point from the camera to the digital processor; and directing the digital processor to perform steps comprising:
selecting the plurality of image reference points from the camera image;

ascertaining the location of the every image reference point on the reference image using the perspective transform and defining the location of the every image reference point on the reference image using the X axis and the Y axis of the reference image;

delineating the Z axis; and establishing the coordinate on the Z axis for the each individual image reference point and defining the estimated coordinate for the each individual image reference point, and correlating the estimated coordinate for the each individual image reference point with the image coordinate corresponding to the each individual image reference point;

determining the estimated camera position on the X axis, the Y axis, and the Z axis and the camera orientation about the X axis, the Y axis, and the Z axis by minimizing the error function; and determining the position of the aerial vehicle over the planetary terrain based on the estimated camera position on the X axis, the Y axis, and the Z axis.

9. The method of claim 1 further comprising selecting the error function where an absolute value of the error function decreases as a summation of each individual displacement comprising the plurality of displacements decreases.

10. The method of claim 9 where the X axis is perpendicular to the Y axis and the Z axis is perpendicular to the X axis and the Y axis.

11. An apparatus for determining a location over a planetary terrain comprising:
an aerial vehicle;
a camera mechanically attached to the aerial vehicle, where the camera defines a field-of-view and defines an image coordinate system defining locations within the field-of-view, and where the field-of-view comprises at least a first reference point at a first image coordinate, a second reference point at a second image coordinate, and a third reference point at a third image coordinate; and
a digital processor mechanically attached to the aerial vehicle, where the digital processor is in data communication with the camera, and where the digital processor comprises a memory storing a reference image of the planetary terrain, where the reference image of the planetary terrain comprises a plurality of imaged points where a location of each imaged point on the reference image is defined by an X coordinate on an X axis and a Y coordinate on a Y axis where the X axis and the Y axis are coplanar in an XY plane, and where the memory comprises a plurality of reference image features extracted from the plurality of imaged points, where each reference image feature is associated with at least one X coordinate on the X axis and at least one Y coordinate on the Y axis, and the digital processor programmed to perform steps comprising:
retrieving the plurality of reference image features from the memory;
generating a perspective transform by:
directing the camera to capture an image within the field-of-view of the camera, thereby generating a camera image;
receiving the camera image;
generating a first image reference point using the image coordinate system of the camera, a second image reference point using the image coordinate system of the camera, and a third image reference point using the image coordinate system of the camera, where the first image reference point is a portion of the camera image located at the first image coordinate of the camera, the second image reference point is a portion of the camera image located at the second image coordinate of the camera, and the third image reference point is a portion of the camera image located at the third image coordinate of the camera;
extracting a plurality of camera image features from the camera image; and
determining the perspective transform between the camera image and the reference image by conducting an image registration of the camera image and the reference image using the plurality of reference image features and the plurality of camera image features, thereby generating the perspective transform;
defining a first estimated coordinate, a second estimated coordinate, and a third estimated coordinate by:
ascertaining a location of the first image reference point on the reference image using the perspective transform and defining the location of the first imaged coordinate on the reference image using the X axis and the Y axis of the reference image;
ascertaining a location of the second image reference point on the reference image using the perspective transform and defining the location of the second imaged coordinate on the reference image using the X axis and the Y axis of the reference image;
ascertaining a location of the third image reference point on the reference image using the perspective transform and defining the location of the third imaged coordinate on the reference image using the X axis and the Y axis of the reference image;
delineating a Z axis where the Z axis the Z axis intersects the XY plane at a single point;
establishing a coordinate on the Z axis for the first image reference point, a coordinate on the Z axis for the second image reference point, and a coordinate on the Z axis for the third image reference point;
defining the first estimated coordinate where the first estimated coordinate comprises the location of the first image reference point on the reference image and the coordinate on the Z axis for the first image reference point;
defining the second estimated coordinate where the second estimated coordinate comprises the location of the second image reference point on the reference image and the coordinate on the Z axis for the second image reference point; and
defining the third estimated coordinate where the third estimated coordinate comprises the location of the third image reference point on the reference image and the coordinate on the Z axis for the third image reference point;
determining an estimated camera position on the X axis, the Y axis, and the Z axis and a camera orientation about the X axis, the Y axis, and the Z axis by minimizing an error function, where the error function comprises a displacement between a first terrain coordinate and the first estimated coordinate, a displacement between a second terrain coordinate and the second estimated coordinate, and a displacement between a third terrain coordinate and the third estimated coordinate, where the first terrain coordinate is a projection of the first reference point from the estimated camera position to the reference image, the second terrain coordinate is a projection of the second reference point from the estimated camera position to the reference image, and the third terrain coordinate is a projection of the third reference point from the estimated camera position to the reference image, and where the projection of the first reference point, the projection of the second reference point, and the projection of the third reference point are a function of the image coordinate system of the camera; and
determining the position of the aerial vehicle over the planetary terrain based on the estimated camera position on the X axis, the Y axis, and the Z axis and the camera orientation about the X axis, the Y axis, and the Z axis, thereby determining the location over the planetary terrain.

12. The apparatus of claim 11 where the memory further comprises a plurality of reference images and where digital processor is further programmed to perform steps comprising:
estimating a location of the aerial vehicle over the planetary terrain and estimating an orientation of the camera comprising the aerial vehicle at the location, thereby generating an estimated location and an estimated orientation; and retrieving a specific reference image from a plurality of reference images comprising the memory based on the estimated location and the estimated orientation and using the specific reference image as the reference image.

13. The apparatus of claim 12 where the memory further comprises a planned trajectory of the aerial vehicle, where the planned trajectory comprises one or more trajectory points where each trajectory point is associated with an individual X coordinate on the X axis, an individual Y coordinate on the Y axis, and an individual Z coordinate on the Z axis, and where the digital processor is further programmed to perform steps comprising:

receiving the planned trajectory from the memory; and generating the estimated location and the estimated orientation based on a trajectory point comprising the planned trajectory.

14. The apparatus of claim 12 where the memory further comprises a plurality of individual reference image features for each individual reference image comprising the plurality of reference images, and where the digital processor is further programmed to retrieve the plurality of individual reference image features when the each individual reference image is the specific reference image; and utilize the plurality of individual reference image features as the plurality of reference image features when the each individual reference image is the specific reference image.

15. A method of determining the position of an aerial vehicle over a planetary terrain comprising:

generating a plurality of reference image features by:

obtaining a reference image of the planetary terrain where the reference image of the planetary terrain comprises a plurality of imaged points where a location of each imaged point on the reference image is defined by an X coordinate on an X axis and a Y coordinate on a Y axis where the X axis is perpendicular to the Y axis and the X axis and the Y axis are coplanar in an XY plane; and extracting the plurality of reference image features from the plurality of imaged points and associating each reference image feature with at least one X coordinate on the X axis and at least one Y coordinate on the Y axis, thereby generating the plurality of reference image features;

delineating a Z axis where the Z axis is perpendicular to the X axis and the Y axis;

obtaining elevation data where the elevation data provides an elevation on the Z axis for every imaged point comprising the plurality of imaged points;

placing the aerial vehicle over the planetary terrain, where the aerial vehicle comprises a camera and where the camera defines a field-of-view and defines an image coordinate system defining locations within the field-of-view, and where the field-of-view comprises at least a first reference point at a first image coordinate, a second reference point at a second image coordinate, and a third reference point at a third image coordinate;

generating a perspective transform by:

operating the camera to capture an image of the planetary terrain within the field-of-view of the camera, thereby generating a camera image and thereby generating a first image reference point, a second image reference point, and a third image reference point, where the first image reference point is a portion of the camera image located at the first image coordinate, the second image reference point is a portion of the camera image located at the second image coordinate, and the third image reference point is a portion of the camera image located at the third image coordinate;

extracting a plurality of camera image features from the camera image; and determining the perspective transform between the camera image and the reference image by conducting an image registration of the camera image and the reference image using the plurality of reference image features and the plurality of camera image features, thereby generating the perspective transform;

defining a first estimated coordinate, a second estimated coordinate, and a third estimated coordinate by:

ascertaining a location of the first image reference point on the reference image using the perspective transform and defining the location of the first imaged coordinate using the X axis and the Y axis of the reference image, and defining the location of the first imaged coordinate on the Z axis using the elevation data, thereby defining the first estimated coordinate;

ascertaining a location of the second image reference point on the reference image using the perspective transform and defining the location of the second imaged coordinate on the reference image using the X axis and the Y axis of the reference image, and defining the location of the second imaged coordinate on the Z axis using the elevation data, thereby defining the second estimated coordinate; and ascertaining a location of the third image reference point on the reference image using the perspective transform and defining the location of the third imaged coordinate on the reference image using the X axis and the Y axis of the reference image, and defining the location of the third imaged coordinate on the Z axis using the elevation data, thereby defining the third estimated coordinate;

determining an estimated camera position on the X axis, the Y axis, and the Z axis and a camera orientation about the X axis, the Y axis, and the Z axis by minimizing an error function, where the error function comprises a displacement between a first terrain coordinate and the first estimated coordinate, a displacement between a second terrain coordinate and the second estimated coordinate, and a displacement between a third terrain coordinate and the third estimated coordinate, where the first terrain coordinate is a projection of the first reference point from the estimated camera position to the reference image, the second terrain coordinate is a projection of the second reference point from the estimated camera position to the reference image, and the third terrain coordinate is a projection of the third reference point from the estimated camera position to the reference image, and where the projection of the first reference point, the projection of the second reference point, and the projection of the third reference point are a function of the image coordinate system of the camera, and where an absolute value of the error function decreases as a summation of a $\Delta x_1$, a $\Delta x_2$, and a $\Delta x_3$ decreases, where the $\Delta x_1$ is equal to the displacement between the first terrain coordinate and the first estimated coordinate, the $\Delta x_2$ is equal to the displacement between the second terrain coordinate and the second estimated coordinate, and the $\Delta x_3$ is equal to the displacement between the third terrain coordinate and the third estimated coordinate; and determining the position of the aerial vehicle over the planetary terrain based on the estimated camera position on the X axis, the Y axis, and the Z axis and the camera orientation about the X axis, the Y axis, and the Z axis.

16. The method of claim 15 further comprising:

determining a position of the camera with to respect to a body fixed coordinate system of the aerial vehicle when the camera captures the image of the planetary terrain; and estimating an attitude of the aerial vehicle using the camera orientation about the X axis, the Y axis, and the Z axis and the position of the camera with to respect to the body fixed coordinate system of the aerial vehicle when the camera captures the image of the planetary terrain.

17. The method of claim 15 further comprising:

estimating a location of the aerial vehicle over the planetary terrain and estimating an orientation of the camera comprising the aerial vehicle at the location, thereby generating an estimated location and an estimated orientation; and obtaining the reference image of the planetary terrain by selecting a specific reference image from a plurality of reference images based on the estimated location and the estimated orientation.

18. The method of claim 17 further comprising:

placing the aerial vehicle over the planetary terrain by:

determining a planned trajectory of the aerial vehicle over the terrain, where the planned trajectory comprises one or more trajectory points where each trajectory point is associated with an individual X coordinate on the X axis, an individual Y coordinate on the Y axis, and an individual Z coordinate on the Z axis; and directing the aerial vehicle to execute the planned trajectory over the terrain, thereby placing the aerial vehicle over the planetary terrain; and generating the estimated location and the estimated orientation based on a trajectory point comprising the planned trajectory of the aerial vehicle over the terrain.

19. The method of claim 17 further comprising extracting a plurality of individual reference image features from each individual reference image comprising the plurality of reference images and using the plurality of individual reference image features as the plurality of reference image features when the each individual reference image is used as the specific reference image.

* * * * *